United States Patent
Shepherd et al.

(10) Patent No.: US 8,520,896 B2
(45) Date of Patent: Aug. 27, 2013

(54) METHOD AND APPARATUS FOR ACQUIRING ACCURATE BACKGROUND INFRARED SIGNATURE DATA ON MOVING TARGETS

(75) Inventors: Robert A. Shepherd, Fort Worth, TX (US); David R. Schlichte, Irving, TX (US); Richard A. Shepherd, Avon, IN (US); Kendall E. Goodman, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 217 days.

(21) Appl. No.: 12/989,933

(22) PCT Filed: Feb. 2, 2009

(86) PCT No.: PCT/US2009/032829
§ 371 (c)(1),
(2), (4) Date: Oct. 27, 2010

(87) PCT Pub. No.: WO2009/134490
PCT Pub. Date: Nov. 5, 2009

(65) Prior Publication Data
US 2011/0142284 A1    Jun. 16, 2011

Related U.S. Application Data

(60) Provisional application No. 61/049,834, filed on May 2, 2008.

(51) Int. Cl.
*G06K 7/015* (2006.01)
(52) U.S. Cl.
USPC ........................................................ 382/103
(58) Field of Classification Search
None
See application file for complete search history.

(56) References Cited

U.S. PATENT DOCUMENTS

| | | | |
|---|---|---|---|
| 3,177,362 A * | 4/1965 | Kutzscher et al. | 250/348 |
| 3,783,271 A * | 1/1974 | Abbott et al. | 250/203.3 |
| 4,367,913 A * | 1/1983 | Logan et al. | 359/555 |
| 4,497,065 A | 1/1985 | Tisdale et al. | |
| 5,001,650 A | 3/1991 | Francis et al. | |
| 5,521,634 A * | 5/1996 | McGary | 348/169 |
| 6,422,508 B1 | 7/2002 | Barnes | |
| 7,151,447 B1 | 12/2006 | Williams et al. | |
| 7,561,784 B2 * | 7/2009 | Wescott et al. | 396/13 |
| 2009/0121072 A1 * | 5/2009 | Aragones et al. | 244/3.16 |
| 2009/0326383 A1 * | 12/2009 | Barnes et al. | 600/476 |

OTHER PUBLICATIONS

International Search Report mailed by ISA/US on Mar. 11, 2009 for PCT/US09/32829.
International Preliminary Report on Patentability mailed by IPEA/US on Jul. 13, 2010 for PCT/US09/32829.
European Search Report dated Dec. 6, 2012 from counterpart EP App. No. 09739293.0.

* cited by examiner

*Primary Examiner* — Jason M Repko
*Assistant Examiner* — Ryan Potts
(74) *Attorney, Agent, or Firm* — James E. Walton; Richard G. Eldredge

(57) ABSTRACT

A method for measuring an infrared signature of a moving target includes: tracking the moving target with a tracking system along a path from a start position to an end position, measuring infrared radiation data of the moving target along the path, repositioning the tracking system to the start position, retracing the path to measure the infrared radiation data of the background, and determining the infrared signature of the moving target by comparing the infrared radiation data of the moving object with the infrared radiation data of the background without the moving object.

15 Claims, 1 Drawing Sheet

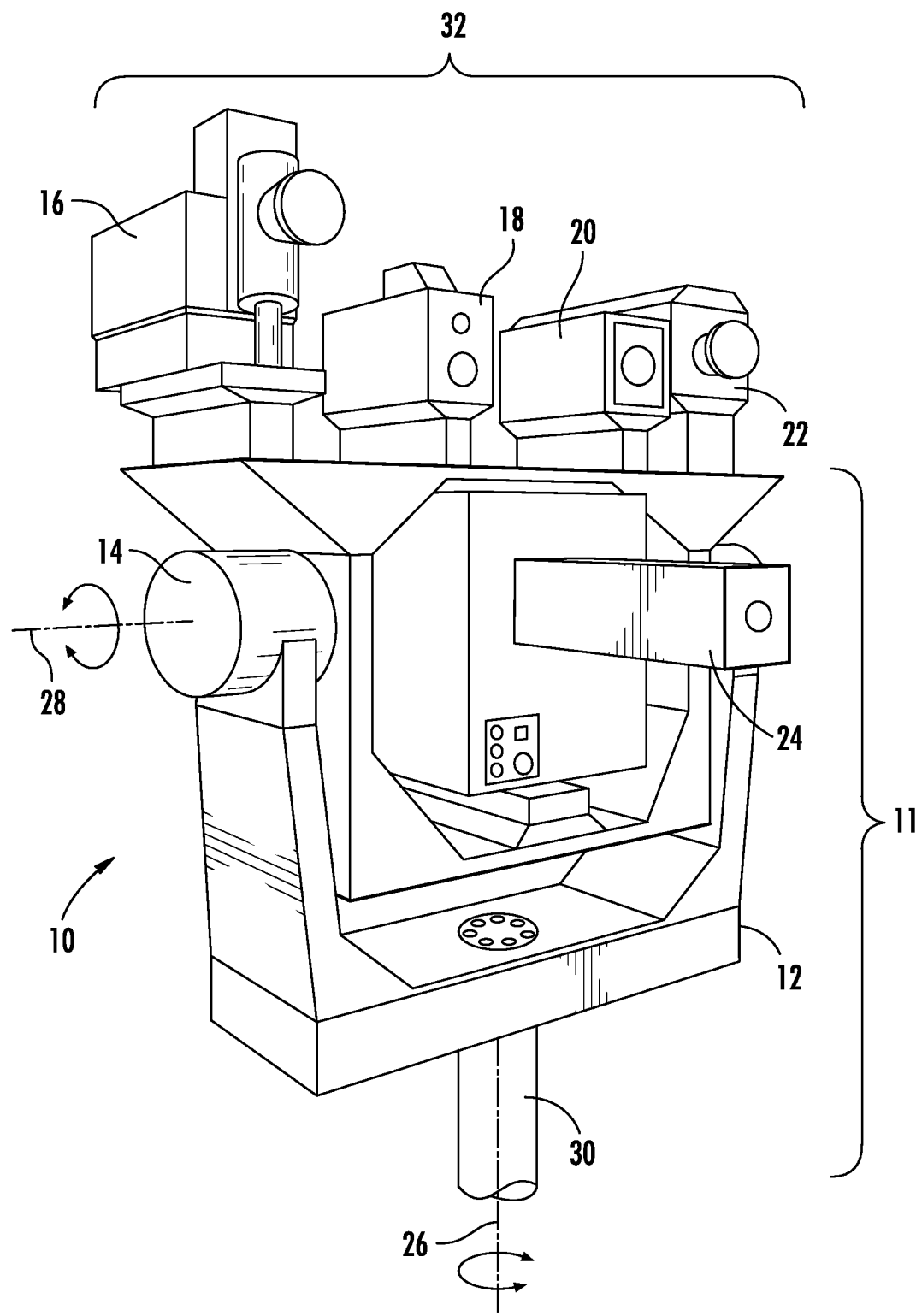

METHOD AND APPARATUS FOR ACQUIRING ACCURATE BACKGROUND INFRARED SIGNATURE DATA ON MOVING TARGETS

TECHNICAL FIELD

The present invention relates to systems for tracking the infrared signatures of moving targets.

DESCRIPTION OF THE PRIOR ART

The phrase "infrared signature" is often used by defense scientists and military personnel to describe the appearance of objects to infrared sensors. An infrared signature depends on many factors, including the shape and size of the object, temperature and emissivity, the background against which the object is viewed, and the waveband of the detecting sensor. For example, the infrared signature of a truck viewed against a field will vary significantly with changing weather, time of day, and engine loading.

There are two main purposes for studying infrared signatures: one is to understand the likely infrared signature of certain threats, so that equipment can be developed to detect the threats; and the second, to reduce the infrared signature of one's own assets to opposing threat sensors. In practice, this might mean equipping a warship with sensors to detect the exhaust plumes of incoming anti-ship missiles, while also having an infrared signature below the detection threshold of the infrared sensor guiding the missile.

Infrared (IR) signature measurements of military aircraft are needed to assess vulnerability to IR missiles and to evaluate efforts to reduce this vulnerability; however, the low IR signatures of modern military aircraft, especially rotorcraft, present a major measurement challenge. IR signature measurement results are often very noisy and irreproducible.

The IR signature is a contrast quantity. Two IR radiation measurements are required to determine the IR signature of an aircraft: (1) that of the aircraft, often referred to as the target measurement; and (2) that of the aircraft's surroundings, often referred to as the background measurement. The IR signature is calculated by taking the difference between these two measurements. The uncertainty of the result is dependent on the accuracy of the background measurement, as well as the accuracy of target measurement. It is important that both measurements be as accurate as possible.

In a typical IR signature measurement, a tracker, which is usually a motorized pan-and-tilt platform, is used to keep the IR sensors aimed at the target aircraft in flight. After the target data is acquired, the tracker is stopped. After the target aircraft flies out of the sensors' fields of view, the IR signature of the background at the final scene is measured. The main problem with this technique is that the background data is only valid for the final scene of the target measurement. However, during the target measurement, the aircraft was moving and the background scene was changing.

Although great strides have been made in the area of tracking the infrared signatures of moving targets, considerable shortcomings remain.

BRIEF DESCRIPTION OF THE DRAWINGS

The novel features believed characteristic of the invention are set forth in the description. However, the invention itself, as well as, a preferred mode of use, and further objectives and advantages thereof, will best be understood by reference to the following detailed description when read in conjunction with the accompanying drawings, wherein:

FIG. 1 is a perspective view of the preferred embodiment of a system for tracking the infrared signature of moving targets according to the present application.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Referring to FIG. 1 in the drawings, a perspective view of the preferred embodiment of a tracker system 10 according to the present application is illustrated. Tracker system 10 preferably comprises a pan-and-tilt tracker platform 12 and a tracker assembly 32. Tracker platform 12 enables tracker assembly 32 to track a moving object (not shown) along a path (not shown). Tracker platform 12 is pivotally coupled to a ground base (not shown) via a shaft 30. An actuator system 11 is operably associated with the ground base for rotating shaft 30, tracker platform 12, and tracker assembly 32 about axes 26 and 28. Actuator system 11 may include one or motors 14 and other components for precisely and accurately moving tracker platform 12 and tracker assembly 32 in response to selected inputs.

Tracker assembly 32 preferably comprises various infrared, video, and laser sensors, including at least one mid-wave IR (MWIR) imager 16, at least one long-wave IR (LWIR) imager 22, at least one laser rangefinder 18, at least one video camera 20, and at least one spectrometer 24. It will be appreciated that tracker system 10 is operably associated with a remote control station and may be connected to a wired or wireless communications network for receiving and transmitting data. The remote control station is preferably a building, trailer, or similar structure; however, it should be understood that the remote control station may be a portable computing device, such as a laptop computer, personal digital assistant, cell phone, or any other suitable computing device.

In operation, tracker system 10 records and repeats its motions. This feature allows tracker system 10 to take measurements on a moving target, such as an aircraft, then, retrace the aircraft's flight path to accurately measure the IR signature of the actual background. By measuring the IR signature of the actual background along the path of the aircraft, tracker system 10 is able to make very sensitive and very accurate IR signature calculations and measurements of the moving target.

Step 1: Target Measurement—For the target measurement, the moving target, i.e., the aircraft, is tracked, either automatically or manually, via at least one display device (not shown) for displaying live video signals from at least one video and/or infrared camera, such as MWIR imager 16, LWIR imager 22, and/or video camera 20. This is done by an operator placing and keeping crosshairs on the aircraft as the aircraft moves through a target zone. MWIR imager 16, LWIR imager 22, and/or video camera 20 are preferably mounted on tracker assembly 32, and the display device is preferably located in the remote control station. The motions of tracker assembly 32 are recorded from a "start" position to an "end" position. While the aircraft is in the crosshairs, the operator selectively triggers the sensors to record target data, including IR radiation data. The trigger signals sent by the operator switch the sensors between an "on" mode, an "off" mode, or other modes. As the target data is recorded, a time-log file is generated that records the motions of tracker assembly 32, along with the status of the trigger signal, i.e., whether the sensors are in the "on" mode. the "off" mode, or any other mode. At the completion of the target measurement, which is usually a few seconds in duration, the operator commands the sensors to stop recording data and closes the log file.

Step 2: Background Measurement—After the aircraft has flown out of the sensors' fields of view and the target measurements have been recorded, the operator commands tracker assembly 32 to return to the "start" position, repeat the tracker movements, and resend the trigger signals based on the previously generated log file. This procedure is referred to herein as "digital tracker playback." This digital tracker playback is the capability of tracker system 10 to record and repeat its motions. During digital tracker playback, the IR radiation data of the background is measured without the moving target being present. An accurate IR signature of the moving target can then be calculated and/or determined by comparing the IR radiation data of the moving target with the IR radiation data of the background without the moving target.

The result of this digital tracker playback capability is a complete set of time-dependent background data, including IR radiation, that contrasts with the time-dependent target data recorded in Step 1. This feature allows tracker system 10 to make measurements on a moving aircraft, then, retrace the flight path to measure the background along the flight path. The digital tracker playback capability of the system of the present application allows the operator to record true background IR data on moving aircraft with digital precision. This innovation increases the accuracy of IR signature measurements, and enables measurement of aircraft heat signatures to very low levels. In addition, the digital tracker playback capability of the system of the present application, supports the development of next-generation aircraft which will have even lower infrared signatures.

It will be appreciated that in some embodiments, it is possible and may be desirable for tracking system 10 to record the background IR data while the tracker assembly retraces its motions in reverse from the "end" position to the "start" position.

It is apparent that an invention with significant advantages has been described and illustrated, including: (1) the ability to obtain accurate and precise background IR measurements; and (2) a system that can record its motions and replay the path of a moving target via digital tracker playback.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Although the present application is shown in a limited number of forms, it is not limited to just these forms, but is amenable to various changes and modifications without departing from the spirit thereof.

The invention claimed is:

1. A method to determine an infrared signature of a moving target traveling along a path, the path having a start position and an end position, the method comprising:
providing a movable pan-and-tilt tracker platform;
operably associating a tracker assembly with the pan-and-tilt tracker platform for tracking the moving target;
tracking the path of the moving target with the tracker assembly by moving the pan-and-tilt tracker platform;
recording, in a log file, movement data representative of the movements of the pan-and-tilt platform between the start position and the end position of the path as a function of time;
operably associating at least one infrared sensor with the tracker assembly for obtaining infrared radiation data;
generating trigger signals for triggering at least one infrared sensor to measure infrared radiation data from the moving target at a plurality of desired trigger points along the path while the moving target moves and defines the path;
recording, in the log file, trigger status data representative of the trigger status as a function of time;
repositioning the pan-and-tilt tracker platform to the start position;
retracing the movements of the pan-and-tilt platform between the recorded start position and the end position of the path according to the movement data recorded in the log file;
regenerating the trigger signals based on the trigger status data recorded in the log file causing triggering of at least one infrared sensor to measure infrared radiation data from the background at the plurality of trigger points defined in the target-tracking step while the pan-and-tilt platform moves along the path of the moving target; and
comparing the infrared radiation data from the moving target taken from the plurality of trigger points along the path with the infrared radiation data from the background taken at the plurality of trigger points along the path to determine the infrared signature of the moving target.

2. The method according to claim 1, further comprising:
providing a remote control system for remotely controlling the pan and tilt angles of the tracker assembly.

3. The method according to claim 2, wherein the step of tracking a path of the moving target is achieved by using the remote control system.

4. The method according to claim 1, wherein the step of operably associating at least one infrared sensor with the tracker assembly is achieved by operably associating at least one mid-wave infrared imager with the tracker assembly.

5. The method according to claim 1, wherein the step of operably associating at least one infrared sensor with the tracker assembly is achieved by operably associating at least one long-wave infrared imager with the tracker assembly.

6. The method according to claim 1, wherein the step of tracking a path of the moving target is achieved by using at least one laser range finder.

7. The method according to claim 1, wherein the step of tracking a path of the moving target is achieved by using at least one video camera.

8. The method according to claim 1, wherein the step of tracking a path of the moving target is achieved by using at least one spectrometer.

9. An apparatus to determine an infrared signature of a moving target traveling along a path, the path having a start position and an end position, the apparatus comprising:
   a movable pan-and-tilt tracker platform;
   a tracker assembly operably associated with the pan-and-tilt tracker platform for tracking the moving target;
   an actuator system for moving the pan-and-tilt tracker platform, so as to track the path of the moving target with the tracker assembly;
   a control station for recording, in a log file, movement data representative of the movements of the pan-and-tilt platform between the start position and the end position along the path, and trigger status data representative of trigger status as a function of time during the movements of the pan-and-tilt platform between the start position and the end position along the path; and
   at least one infrared sensor operably associated with the tracker assembly for first obtaining target infrared radiation data at a plurality of selected trigger points along the path according to trigger signals and then obtaining background infrared radiation data at the plurality of selected trigger points along the path according to regenerated trigger signals;
   wherein said regenerated trigger signals are based upon the trigger status data recorded in the log file; and
   wherein the apparatus is configured to compare the target infrared radiation data with the background infrared radiation data along the path at the plurality of selected trigger points to determine the infrared signature of the moving target.

10. The apparatus according to claim 9, wherein the at least one infrared sensor is a mid-wave infrared imager.

11. The apparatus according to claim 9, wherein the at least one infrared sensor is a long-wave infrared imager.

12. The apparatus according to claim 9, further comprising:
   at least one laser range finder.

13. The apparatus according to claim 9, further comprising:
   at least one video camera.

14. The apparatus according to claim 9, further comprising:
   at least one spectrometer.

15. The apparatus according to claim 9, wherein the control system is located remote from the tracker platform.

* * * * *